Patented Apr. 16, 1935

1,997,773

UNITED STATES PATENT OFFICE 1,997,773

PROCESS FOR TREATING WASTE LIQUORS FROM CELLULOSE DIGESTION TO REGENERATE THEIR ALKALI METAL COMPOUND CONTENT

Gustaf Haglund, Stockholm, Sweden, assignor to Patentaktiebolaget Gröndal-Ramen, Stockholm, Sweden No Drawing. Application March 7, 1931, Serial No. 521,004. In Germany March 24, 1930

6 Claims. (Cl. 23—48)

When waste liquor from a cellulose digestion process employing cooking liquor containing an alkali-sulphur compound is burned, there is formed a molten mass containing sulphide, thiosulphate, sulphite, carbonate and hydrate of the alkali employed and also other components such as iron sulphide, silicates etc. which only occur in small quantities and can be considered as impurities introduced during the treatment.

The composition of the molten mass varies considerably and depends principally on the composition of the waste liquors and to a less degree on the way in which the combustion of the liquors is carried out. When burning waste liquors from a sulphite cellulose digestion with alkali bisulphite as cooking liquor a molten mass with high contents of sulphide and thiosulphate is obtained.

When such a molten mass is leached in order to recover the sulphite, bisulphite or hydrate of sodium, the presence of sulphides and thiosulphates is a hindrance to obtaining suitable cooking liquors for the usual sulphite digestions. If consequently the contents of sulphide or thiosulphate are great, the usual methods will fail.

The invention relates to a process of removing these contents of sulphides or thiosulphates from the molten mass before it is dissolved in or leached with water for preparing of a new cooking liquor.

According to a process of the invention, the molten mass obtained through combustion of such waste liquors is cooled and crushed to produce a finely divided product comprising solid particles. The finely divided product is subjected to a roasting treatment at a temperature between limits determined on the one hand by the oxidation of the sulphides and the decomposition of the thiosulphate, and on the other hand by the sintering of the molten mass. It may sometimes be found suitable to store the finely crushed mass before the roasting because the oxidation is thereby accelerated and facilitated.

The sulphides contained in the molten mass are oxidized at an ordinary temperature if the finely crushed molten mass is exposed to the air for some time. However, the oxidation occurs much more rapidly if the temperature is increased. For the oxidation of the sulphides a higher temperature is not required than that needed for the decomposition of the thiosulphate.

The decomposition of the thiosulphate is effected at a temperature of about 240° C. and is accelerated if the temperature is increased above this point. The composition of the atmosphere in which the process takes place may also influence the decomposition. The sintering of the molten mass takes place at about 500° C., a temperature that may vary a little according to the composition of the molten mass. It is therefore possible to carry out the oxidation of the sulphides and the decomposition of the thiosulphates at temperatures below the sintering temperatures of the molten mass, which is an advantage because the material can then be easily stirred and handled.

The roasting of the sulphides and the decomposition of thiosulphates are not unfavourably influenced by the presence of furnace gases such as carbon dioxide and sulphur dioxide, and the roasting can consequently be carried out commercially in such a way that combustion gases from a furnace for burning waste liquors, combustion gases from heating plant or other furnaces are directed over the finely crushed material. Hot air can also be used for this purpose if conditions should allow. The product of the roasting treatment will contain alkali carbonates, alkali sulphites and sulphates and as impurities silicates and may also contain a small quantity of sulphides of the heavy metals.

The following example illustrates the results which can be obtained by means of the process of the invention.

A waste liquor from a sulphite cellulose digestion was incinerated in an oxidizing atmosphere in the usual manner. The residue gave the following analysis:

$Na_2CO_3 + NaOH = 20.9\%$
$Na_2S = 26.4\%$
$Na_2SO_3 = 1.2\%$
$Na_2S_2O_3 = 6.1\%$
$Na_2SO_4 = 32.6\%$
Insoluble in water — 12.4%

When the molten mass so obtained was treated in accordance with the present invention and was thereafter roasted at a temperature of 240° C. to 500° C. a product was obtained which gave the following analysis:

$Na_2CO_3 = 18.8\%$
$Na_2S = 0.2\%$
$Na_2SO_3 = 29.2\%$
$Na_2S_2O_3 = 0.8\%$
$Na_2SO_4 = 40.0\%$
Insoluble in water — 12.2%

The roasted product is dissolved in water, and the silicates, sulphides of the heavy metals and other insoluble parts are filtered off, whereupon the solution is treated according to known methods so that it will consist in the main of alkali sulphite, bisulphite or hydrate and small quantities of sulphate in which form it can be used once more as a cooking liquor.

Having now particularly described the nature of my invention and the manner of its operation, what I claim is:

1. In a process for producing cooking liquors for cellulose digestion processes involving the use of waste liquor from such processes containing alkali metal compounds and sulphur compounds, the method of recovering alkali metal salts from the waste liquor which comprises concentrating and incinerating the liquor to remove water and combustible organic material and to form a molten product containing alkali metal compounds, cooling the product of the incinerating operation to form a substantially solid product, and subjecting the resulting product to a roasting operation at a temperature sufficiently high to cause rapid oxidation of alkali metal sulphide and decomposition of alkali metal thiosulphate but not high enough to cause substantial sintering of the product.

2. In a process for producing cooking liquors for cellulose digestion processes involving the use of waste liquor from such processes containing alkali metal compounds and sulphur compounds, the method of recovering alkali metal salts from the waste liquor which comprises concentrating and incinerating the liquor to remove water and combustible organic material and to form a molten product containing alkali metal compounds, cooling the product of the incinerating operation to form a substantially solid product, and roasting the resulting product at a temperature above about 240° C. and below about 500° C. to oxidize alkali metal sulphide and decompose alkali metal thiosulphate contained in said product.

3. In a process for producing cooking liquors for cellulose digestion processes involving the use of waste liquor from such processes containing alkali metal compounds and sulphur compounds, the method of recovering alkali metal salts from the waste liquor which comprises concentrating and incinerating the liquor to remove water and combustible organic material and to form a molten product containing alkali metal compounds, cooling and crushing the product of the incinerating operation, and roasting the crushed product at a temperature sufficiently high to cause rapid oxidation of alkali metal sulphide and decomposition of alkali metal thiosulphate but not high enough to cause substantial sintering of the product.

4. In a process for producing cooking liquors for cellulose digestion processes involving the use of waste liquor from such processes containing alkali metal compounds and sulphur compounds, the method of recovering alkali metal salts from the waste liquor which comprises concentrating and incinerating the liquor to remove water and combustible organic material and to form a molten product containing alkali metal compounds, cooling and crushing the product of the incinerating operation, and roasting the crushed product at a temperature above about 240° C. and below the sintering temperature of the product to oxidize alkali metal sulphide and decompose alkali metal thiosulphate contained therein.

5. In a process for producing cooking liquors for cellulose digestion processes involving the use of waste liquor from such processes containing alkali metal compounds and sulphur compounds, the method of recovering alkali metal salts from the waste liquor which comprises concentrating and incinerating the liquor to remove water and combustible organic material and to form a molten product containing alkali metal compounds, cooling and crushing the product of the incinerating operation, and roasting the crushed product at a temperature above about 240° C. and below about 500° C. to oxidize alkali metal sulphide and decompose alkali metal thiosulphate contained therein.

6. In a process for producing cooking liquors for cellulose digestion processes involving the use of waste liquor from such processes containing alkali metal compounds and sulphur compounds, the method of recovering alkali metal salts from the waste liquor which comprises concentrating and incinerating the liquor to remove water and combustible organic material and to form a molten product containing alkali metal compounds, cooling the product of the incinerating operation to form a substantially solid product, and subjecting the resulting product to a roasting operation at a temperature above about 240° C. and below the temperature at which substantial sintering of the product takes place.

GUSTAF HAGLUND.